US006275495B1

(12) United States Patent
Mazzaglia et al.

(10) Patent No.: US 6,275,495 B1
(45) Date of Patent: Aug. 14, 2001

(54) MODULAR ARCHITECTURE PET DECODER FOR ATM NETWORKS

(75) Inventors: Sergio Mazzaglia; Francesco Italia, both of Catania; Mario Lavorgna, Bacoli, all of (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/145,628

(22) Filed: Sep. 2, 1998

(30) Foreign Application Priority Data

Sep. 4, 1997 (EP) .................................................. 97830438

(51) Int. Cl.⁷ ............................. H04L 12/28; H04L 12/56
(52) U.S. Cl. .......................... 370/395; 714/746; 708/492; 708/580
(58) Field of Search .................................. 370/389, 395; 708/490, 492, 530; 714/786, 791, 792, 793, 795, 746

(56) References Cited

U.S. PATENT DOCUMENTS

| 5,574,717 | * | 11/1996 | Tomizawa et al. | 370/244 |
| 5,579,303 | | 11/1996 | Kiriyama | 370/17 |
| 5,907,566 | * | 5/1999 | Benson et al. | 714/798 |
| 6,011,868 | * | 1/2000 | Branden et al. | 382/233 |

FOREIGN PATENT DOCUMENTS

97/31446  8/1997 (WO) .............................. H04L/1/00

OTHER PUBLICATIONS

A. Albanese et al., "Priority Encoding Transmission", *IEEE Transactions on Information Theory*, vol. 42, No. 6, (12/96), pp. 1737–1744.

S. Dravida et al., "Error Detection and Correction Options for Data Services in B–ISDN", *IEEE Journal on Selected Areas in Communications*, vol. 9, No. 9, (12/91), pp. 1484–1495.

* cited by examiner

*Primary Examiner*—Ajit Patel
*Assistant Examiner*—Bob A. Phunkulh
(74) *Attorney, Agent, or Firm*—Theodore E. Galanthay; Allen, Dyer, Doppelt Milbrath & Gilchrist, P.A.

(57) ABSTRACT

A PET decoder for an ATM network has a modular architecture including a processing unit having various memories and a processing pipeline for constructing from a block of m data of a certain number of bits, a square matrix A based on a vector D of relative points over the Galois field. The processing pipeline also decomposes by triangular factorization the square matrix A and solves the subsystem of equations by simple substitution. The decoder also includes a control unit interfacing with the ATM network, a programmable parallel processor, a random access memory and the processing unit.

22 Claims, 6 Drawing Sheets

MODULAR ARCHITECTURE PET DECODER FOR ATM NETWORKS

FIELD OF THE INVENTION

The invention relates in general to digital transmission networks functioning in an Asynchronous Transfer Mode (ATM), and, more particularly, to an error correcting technique for Priority Encoding Transmission (PET).

BACKGROUND OF THE INVENTION

In recent years a widespread use of digital techniques for storing and transmitting information has been witnessed. The success of these techniques is due to the availability of cost effective hardware components. Among network technologies dedicated to the above cited services, the ATM technique (Asynchronous Transfer Mode) permits the transmission of multi-media information in a flexible and efficient manner. The ATM technique was developed to solve all aspects of multi-media applications, video, audio, and data transmissions on a same network, with the same protocol, regardless of the type of network (LAN, MAN or WAN).

The ATM technology provides for a bandwidth with a variable bit-rate that may reach the order of Gigabit/sec and a scalability of the number of network nodes as required by the general architecture of switched networks. Differently from switched circuit networks, the ATM packet-switched network has the advantage of engaging the channel only during the actual transfer of information.

The procedure of traffic control of ATM networks has not yet reached a consolidated standard, with many problems still remaining to be solved. One of the main problems of this technology is the possible loss of packets, which in case of video transmissions may result in a degradation of the images that exceeds acceptable levels. Indeed, in some instances the average loss of packets may reach peaks of about 5%. A loss of packets may occur for different causes:
- when the packets arrive after the maximum permitted time delay;
- when the buffer overflows, that is, when its filling threshold is exceeded; or
- when traffic congestion occurs due to an abrupt variation of the information flow or network hardware problems.

If traffic congestion occurs and some packets are lost, the network is unable to ensure satisfactory service. To provide for adequate bandwidth characteristics, an ATM-base should have the ability to implement a traffic control procedure like, for example, a Call Admission Control (CAC) or of a local control at node level (control of the average and peak number of packets reading the interconnection buffers). Although such procedures may be implemented at their best, packet losses would be in any case inevitable because of the intervention of policing structures through intelligent agents, and in the case of machine malfunctions.

The method developed by Berkeley and referred to as PET (Priority Encoded Transmission)are disclosed in A. Albanese, J. Blömer, J. Edmonds, M. Luby: Priority Encoding Transmission, Technical report, International Computer Science Institute, Berkeley, Calif., August 1994. The method is based on coding the information with different levels of redundancy depending on its importance.

The PET technique is based upon a redundant coding of original information distributed over a plurality of distinct packets. The redundancy added during the coding phase is such that, even in case of loss of coded packets, the original information can be fully retrieved from the information existing in the remaining packets.

The PET Coding Algorithm

The PET coding technique as disclosed in M. O. Rabin: Efficient Dispersal of Information for Security, Load Balancing and Fault Tolerance, Journal of the Association for Computing Machinery, Vol. 36, No. 2, April 1989, is an algorithm of information dispersion that includes adding, to the message to be transmitted, a proper redundancy, before dividing this encoded message into a plurality of portions which represent the packets that are sent through the transmission medium. Even by receiving only a fraction of the total number of the packets it is possible to reconstruct the original message. See also R. Storn: Modeling and Optimization of PET-Redundancy Assignment for MPEG Sequences, Technical report, International Computer Science Institute, Berkeley, Calif., August, May 1995.

The original information stream is divided into a set of messages, coded independently one from the other, as depicted in FIG. 1. Hence, each message is divided into segments, each having a certain priority grade. The priority is generally specified in terms of the minimum percentage of packets of the whole message required to correctly decode the segment as disclosed, for example, in A. Albanese, M. Kalfane, B. Lamparter, M. Luby: Application Programmer Interface to PET, Technical report, International Computer Science Institute, Berkeley, Calif., Aug. 25, 1995; and C. Leichner: Hierarchical Encoding of MPEG Sequences using Priority Encoding Transmission (PET), Dissertation, International Computer Science Institute, Berkeley, Calif., November 1994.

The number of blocks for each segment depends on its length and corresponding priority. The priority of a segment is expressed in terms of its blocks' length: the higher the priority the shorter are the blocks, as shown in FIG. 2. For each segment, the length of the block is the same, because they have the same priority.

The PET coding technique includes considering the m words of the different blocks as the coefficients of a polynomial of order m−1 over a Galois field GF[p], as illustrated in FIG. 3. The polynomial of order m−1, evaluated at different n points over a Galois field GF[p], is uniformly distributed on n packets.

The current implementation of the PET technique is based on erasure codes and considers the use of integer arithmetic instrumental within the Galois field GF[p] (that is the field of the rest of p modulus), within which all the operations are with modulus p. The original information stream is considered as a sequence of unitary elements (for example, bytes of 8 bits or words of 16 bit), which for simplicity in the ensuing text will be referred to as "words".

After having divided the messages into segments, the segments are partitioned into blocks, so that all blocks of the same segment have the same length m (represented by the number of words) according to a scheme as that depicted in FIG. 4. Of course, blocks belonging to different segments may have different lengths.

The m words of each block are considered as the coefficients of a polynomial of order m−1 over the GF[p] field:

$$p(x) = a_0 + a_1 x + a_2 x^2 + \ldots + a_{m-1} x^{m-1}$$

The coding of the block is formed by the sequence of the n words (n≧m) obtained by evaluating the polynomial at n distinct points of GF[p]. These n values are distributed in n packets so that each packet contains only one value of p(x), calculated in a distinct point of GF[p].

The above described algorithm is repeated for each single block of each segment, and the sequence of packets that encode the original message is obtained by grouping within the same packet the polynomial values evaluated for the same point of GF[p] relative to all the segments. In this way, the information relative to each segment is uniformly spread over all the packets.

Of course, when words of 16 bits are mapped over the field GF[$2^{16}$+1], there will be a high probability of not using an element of the Galois field. To avoid possible overflow problems, it is possible to operate always with units of 16 bits (even after the mapping), by eliminating the unused element and keeping its location (which will be referred to as its offset or by the symbol $\epsilon$) properly stored to be able to recover the original value after having completed the execution of the required operations.

Besides the offset of the point at which the polynomial is evaluated, it is necessary to introduce the information relative to the priority of the various segments and to their length, to be able to exactly reconstruct the original message. This information defines a further segment, which in the ensuing description will be referred to as the Priority Table or briefly PT. The priority of the PT segment must be at least equal to that of the segment of highest priority of the message, to make possible the decoding of such a PT segment without waiting for a correct reception of other packets.

Decoding of a segment

First, a decoder must ascertain that the number of packets received is equal to at least the minimum number m required. By assuming that this basic requirement is fulfilled, a vector D of the GF[p] points over the Galois field to which the relative packets, determining this from the packet's headers themselves, is initialized.

$$D = \begin{bmatrix} X_0 \\ X_1 \\ M \\ X_{m-1} \end{bmatrix}$$

Starting from said D vector an m*m square matrix A may create $$A = \begin{bmatrix} x_0^0 & x_0 & x_0^2 & \cdots & x_0^j & \cdots \\ x_1^0 & x_1 & x_0^2 & \cdots & x_1^j & \cdots \\ \vdots & & & & \vdots \\ x_l^0 & x_l & x_l^2 & \cdots & x_l^j & \cdots \\ \vdots & & & & \vdots \\ x_{m-1}^0 & x_{m-1} & x_{m-1}^2 & \cdots & x_{m-1}^j & \cdots \end{bmatrix}$$

It should be noticed that the j-th column of matrix A is provided by the j-th powers of the elements of the vector D. Thus, the decoder must consider all the corresponding words of the m packets relative to the same block (into which the segments are subdivided). These words represent, in a coded form, the m polynomial values associated with the block itself. The decoder must then decode taking into account the respective offset (d), stored in the header, and reconstruct the vector B with the resulting polynomial values:

$$B = \begin{bmatrix} b_0 \\ b_1 \\ \vdots \\ b_{m-1} \end{bmatrix} \quad (1)$$

At this stage the decoder must solve the linear system $$Ax=B \quad (2)$$

where x is a column-vector of m elements, thus obtaining the m words of the original block.

SUMMARY OF THE INVENTION

The object of the present invention is to provide a system for implementing the Priority Encoding Transmission (PET) algorithm having a modular architecture, capable of being realized in a device easily integratable in a hardware system suited for multimedia applications.

The system of the present invention is based upon the recognition of the peculiarity that the A matrix depends only on the points GF[p] to which the PET packets pertain. Therefore, such a matrix remains constant for all the blocks of all the segments of the original message.

Therefore, it may be assumed to invert the matrix A only once for each message rather that once per each single block of each segment. However, even such a procedure would be very laborious and would require either a relatively complex hardware system or long processing times.

Instead of inverting the matrix A, it has been considered to carry out a decomposition, by way of the so-called LU (lower-upper) decomposition, in the product of two square matrices having the same dimensions of the matrix A:

$$A=LU \quad (3)$$

where L (lower) is a triangular lower matrix (that is, having not null elements only along its diagonal and below it), and the matrix U (upper) is a triangular upper matrix (that is, having not null elements only along its diagonal and above it).

Therefore, the solution of the linear system of the original equation (2) becomes the following, $$LUx=B \quad (4)$$

which is in turn decomposable in the following two "sub-problems":

$$Ly=B \quad (5)$$

$$Ux=y \quad (6)$$

These two sub-problems are much simpler than the original problem thanks to the triangular structure of the two matrices L and U. Their solution may be easily reached by simple substitutions.

On this basis, it is possible to realize a dedicated hardware system capable of implementing a PET encoding while remaining relatively simple to integrate in a modular form in a VLSI (Very Large Scale of Integration) device, which may be easily integrated in a hardware system. For example, the hardware system, may be a "set-top-box" system for multimedia applications.

The PET decoder of the invention includes two main modules:

the PU (processing unit) module, which carries out the decoding itself by solving the relative systems of equations;

the CU (Control Unit) module, which interfaces the PU module with the external world, adapts and synchronizes the PET decoder with other external devices, taking into account of the different clocks, recognizes whether or not the format is of the PET type, and supplies to the PU module the information contained in the incoming data packets, in a correct order and format.

Characteristics and advantages of the invention are as follows:

1. The PET device of the invention, if compared to other error correcting decoders based on the Reed-Solomon and Viterbi algorithms, performs an error correction on the whole message rather than on the single bits.

2. The added redundancy is not fixed beforehand as in the case of the Reed-Solomon and Viterbi algorithms, instead, it depends on the nature of the message to be coded. This allows an occupancy of the channel of lower transmission band or in the worst of cases equal to such known techniques of error correcting.

3. The decoder based on the PET algorithm provides for an optimal band occupation, while ensuring a good quality of reception even in the case of packet losses.

4. The modular architecture based on the two units or modules, PU and CU, allows the PET decoder to be independent from the type of format of the data being processed.

5. The decoding is transparent to whether the messages are compressed or not, are pictures or sounds or any other type of information. Of course, it is necessary that the decoder part of an application be supported by the ATM network and that the message be in PET format.

6. The PET decoder is designed to have an independent interface with packet switching networks and whichever scalable application. It may, for example, accept different Quality of Service requests.

7. For applications of this latter type, a certain priority scheme according to which the redundancy is calculated must be prearranged.

8. The usefulness of the decoder of the invention is not limited to applications wherein compressed data are handled. On the contrary the decoder is able to manage any kind of scalable information.

BRIEF DESCRIPTION OF THE DRAWINGS

The various aspects and advantages of the invention will become even clearer through the following description and by referring to the attached drawings wherein:

Figures 1, 2, 3, 4:
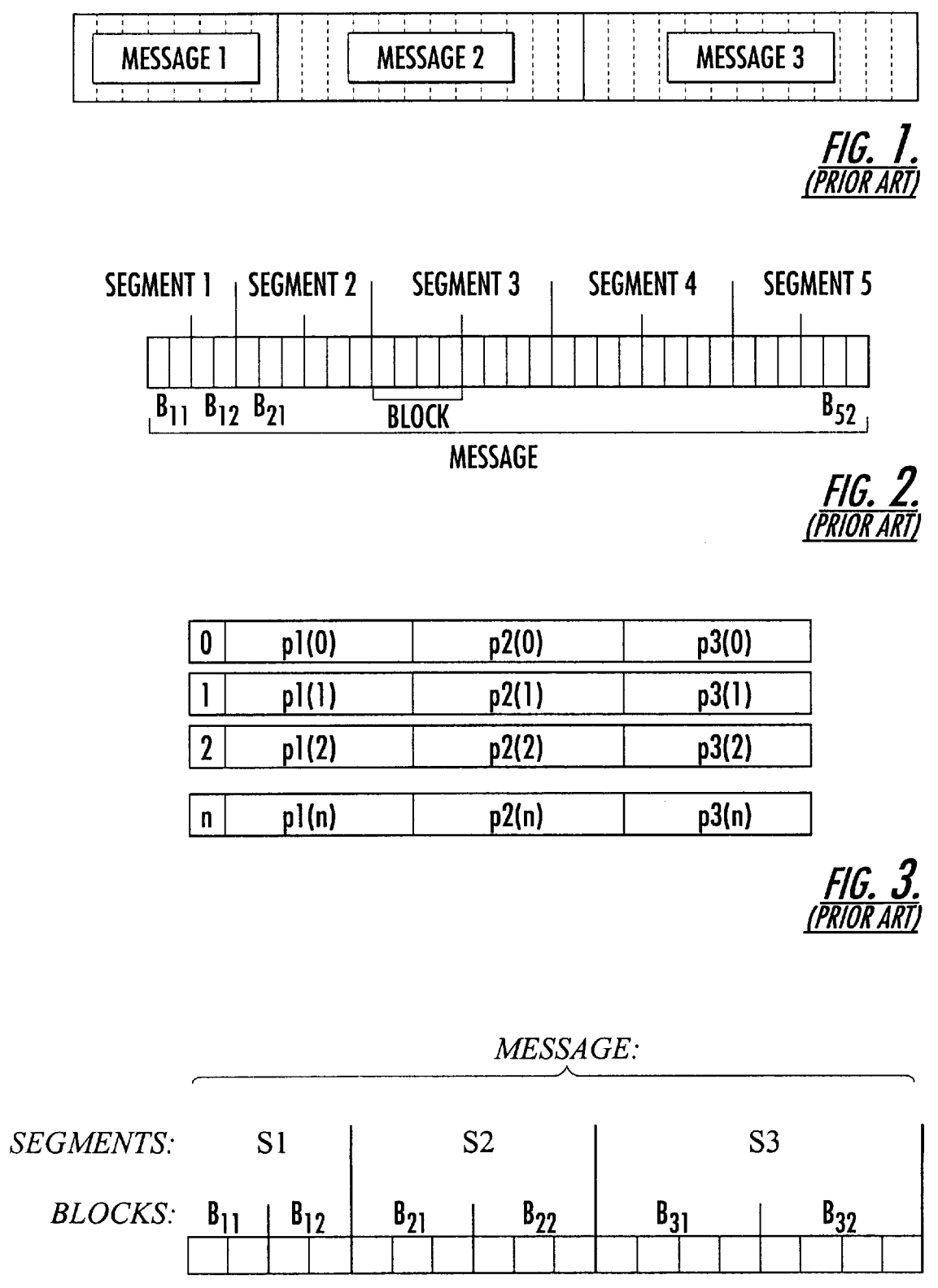

FIG. 1 shows the division of the information stream in independent messages and in segments as in the prior art;

FIG. 2 shows the block structure of each segment as in the prior art;

FIG. 3 shows the PET data coding system of the various blocks into which are divided the segments as the coefficients of a polynomial on a Galois field as in the prior art;

FIG. 4 shows the way the segments are structured in blocks as in the prior art;

Figure 5:
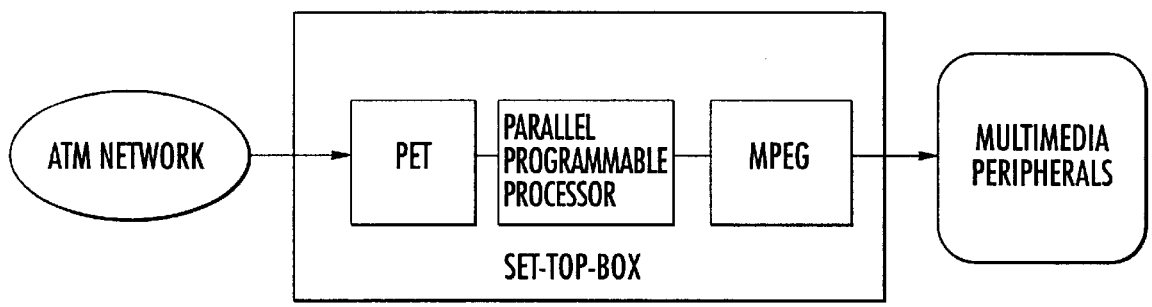
FIG. 5 is a high level functional block diagram of a multimedia hardware application commonly known as "set-top-box" as in the prior art.
Figure 6:
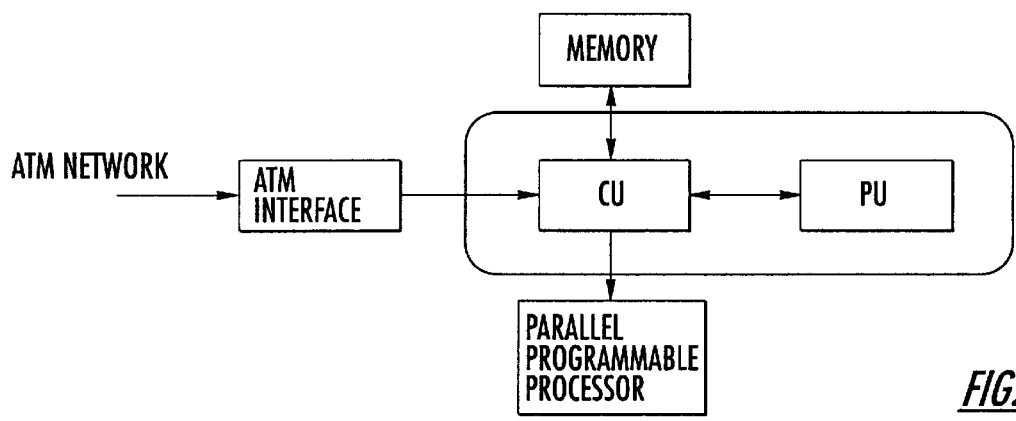
FIG. 6 is a block diagram showing the modular architecture of the decoder of the invention.
Figure 7:
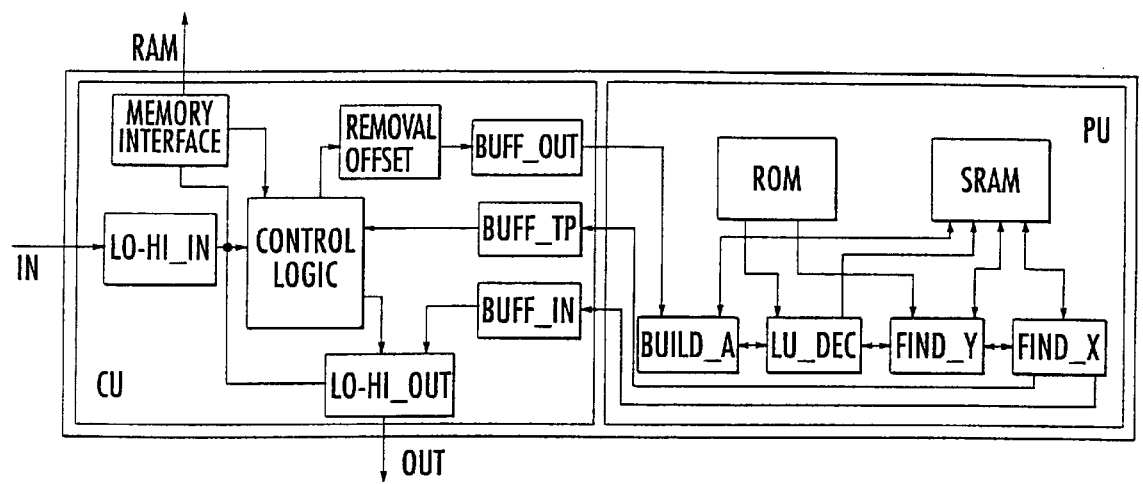
FIG. 7 is a block diagram of a PET decoder realized according to the present invention.
Figure 8:
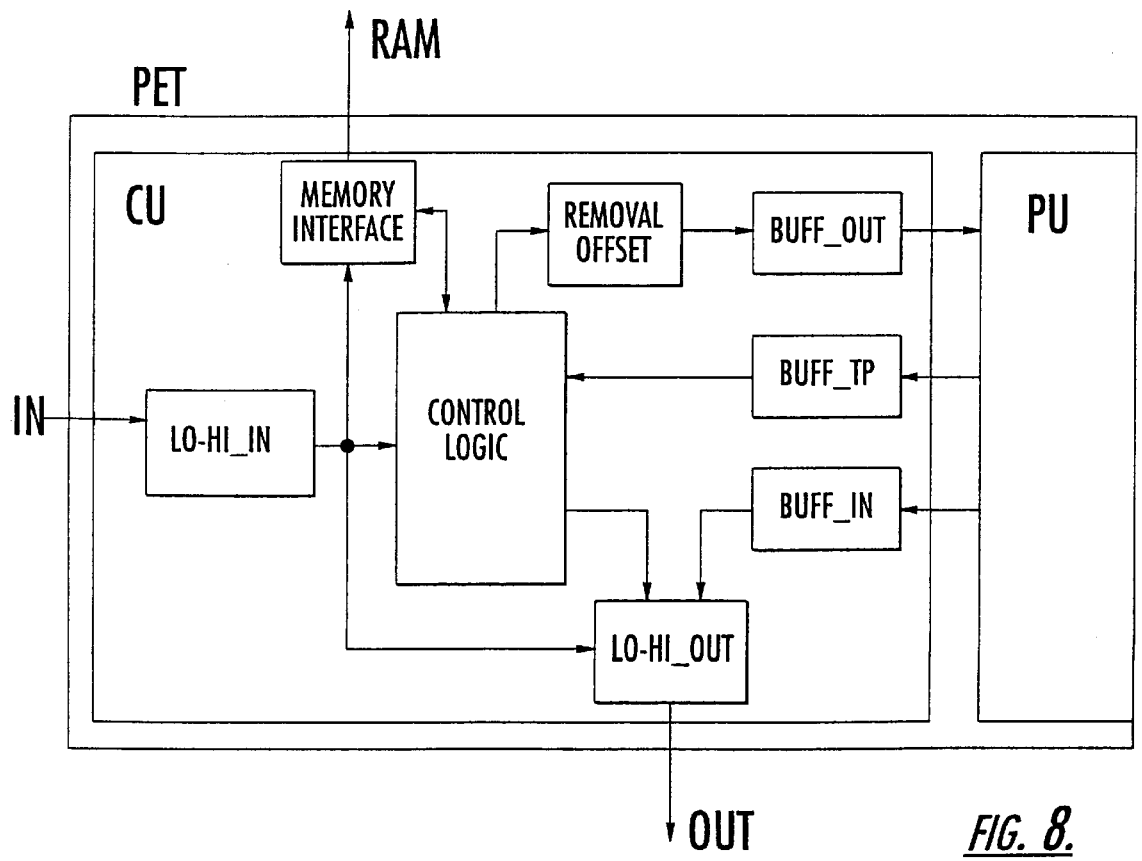
FIG. 8 is a block diagram of the CU unit of the PET decoder of the invention.
Figure 9:
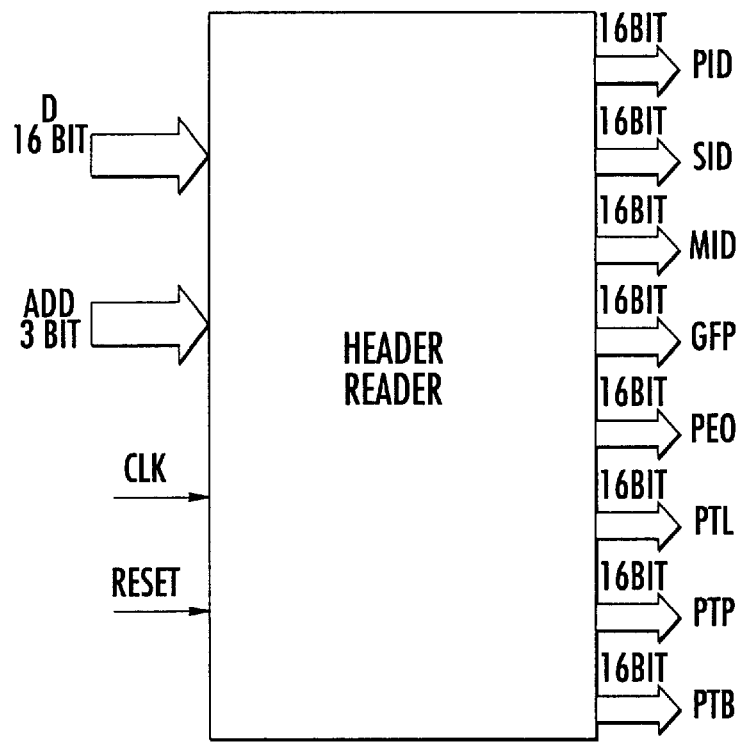
FIG. 9 shows the scheme of the headers reading device of the invention.
Figure 10:
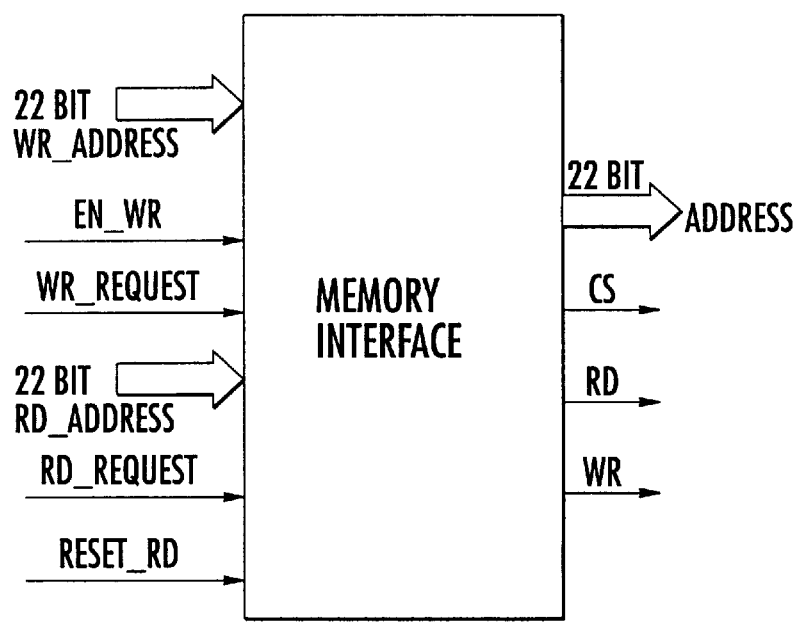
FIG. 10 shows the scheme of the memory interface device of the invention.
Figure 11:
FIG. 11 shows the scheme of the offset removal device of the invention.
Figure 12:
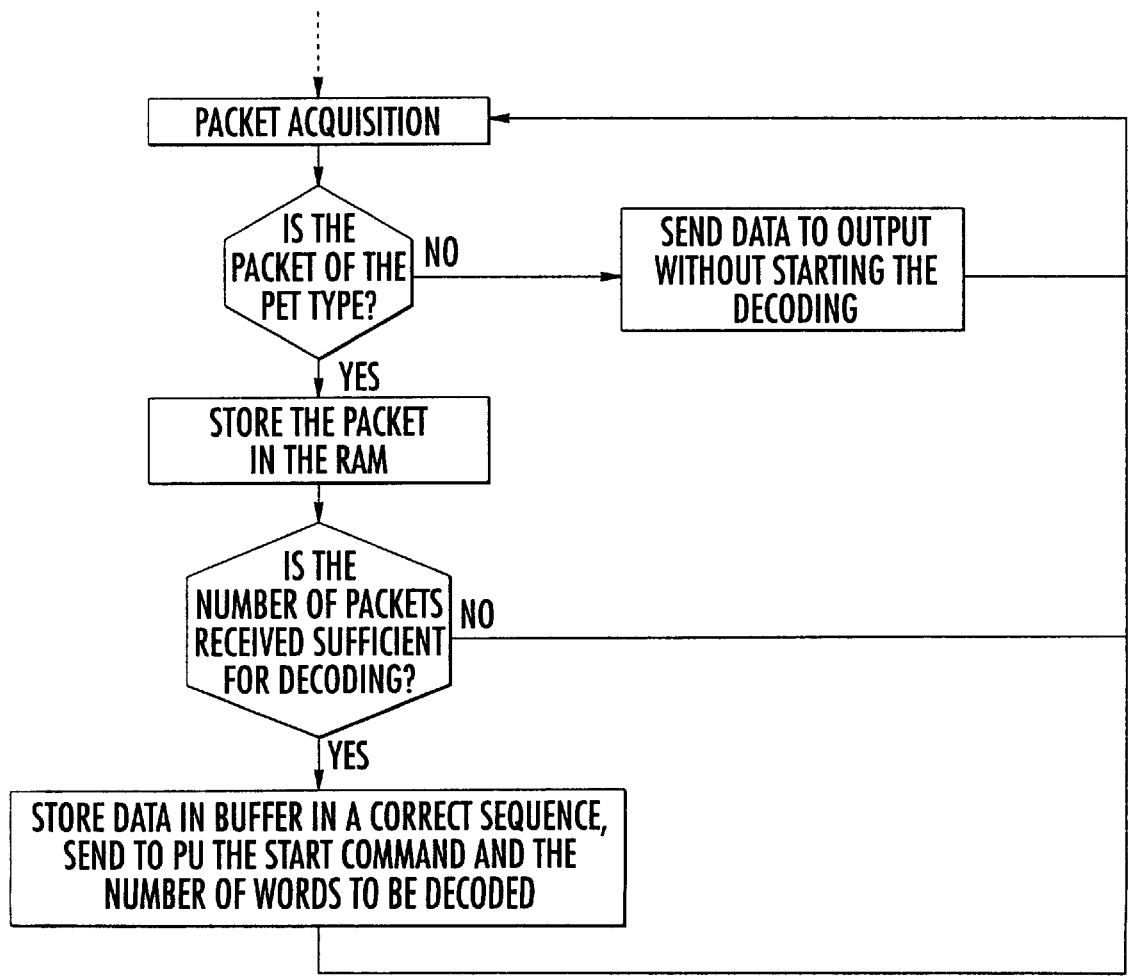
FIG. 12 shows a flow chart of the functions performed by the central unit block of the CU module of the invention.
Figure 13:
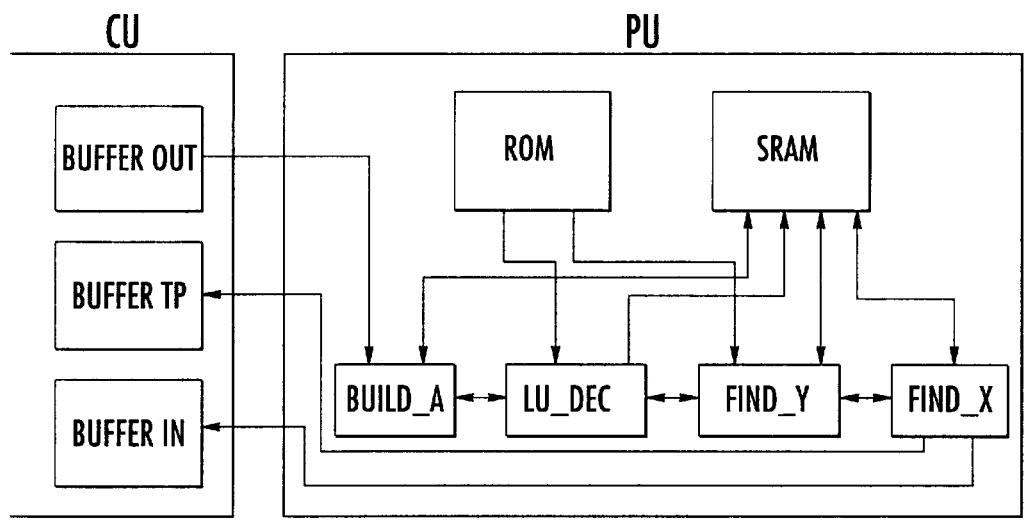
FIG. 13 is a block diagram of the processing Unit of the decoder of the invention.

DETAILED DESCRIPTION OF THE PREFERRED EMBODIMENTS
DESCRIPTION OF THE CONTROL UNIT CU

The tasks of the Control Unit (CU) include reconstructing the blocks to be decoded starting from the packets received, by considering that the original message may be any sequence of information. The control unit CU is practically an interface between the PET decoder and the external world (ATM interface, multi-programmable parallel processor, multimedia peripherals). Moreover it feeds the data to the Processing Unit (PU) according to the required order and format. The ensuing description describes the essential blocks providing the Control Unit CU.

The Lo-Hi_In and Lo-Hi_Out blocks respectively connect the decoder to the ATM network and to a parallel programmable processor allowing, depending on the application, the transfer of 8, 16, 32, 64 bits for each clock pulse.

The Control Logic module represents the core of the CU module. Its task is that of synchronizing the entire system. First, it recognizes the PET format, and in the affirmative case the decoding is started.

The decoding for each block follows the steps shown in the flow chart. The first blocks to be decoded are of course those related to the segments that codify the Priority Table, to obtain the basic information for decoding the successive blocks. The first word acquired at the initial instant, or after a reset operation, is interpreted as the PET packet length.

The Memory Interface block is an arbitration system that prevents possible conflicts between read cycles (when the data supplied by the ATM interface is ready) and the write cycles (by the CU). The main function of this block includes generating interface signals with the memory as needed to manage the read and write cycles. Furthermore, there is a need to solve the problem relating to the bus arbitration for preventing the Lo-Hi_In module to write in the memory while the CU is reading and vice-versa. This problem is overcome by holding a read request if a write request is being served and vice-versa.

The block Offset Removal eliminates the offset from the data by adding 1 if the offset value is less than that of the data. This module has the task of removing the offset introduced during the coding phase, by generating a 17-bit word starting from two words of 16 bits.

The exchange of information between the CU and the PU modules takes place by way of three buffers contained in the CU module: Buff_In, Buff_Out and Buff_TP. The CU stores in Buff_Out the necessary information for the decoding, delivers to the PU module a start signal and indicates whether the information relate to a TP. The PU, after having performed the decoding, stores the data in Buff_TP if the data related to the priority table or in Buff_In if they related to messages.

It should be noticed the presence of a common bus among the blocks: Control Logic, Memory interface, Lo-Hi In, Lo-Hi Out and Offset Removal, this is deliberately realized to make the system faster as the data may be acquired simultaneously by more blocks.

DESCRIPTION OF THE PROCESSING UNIT

Figure 14:
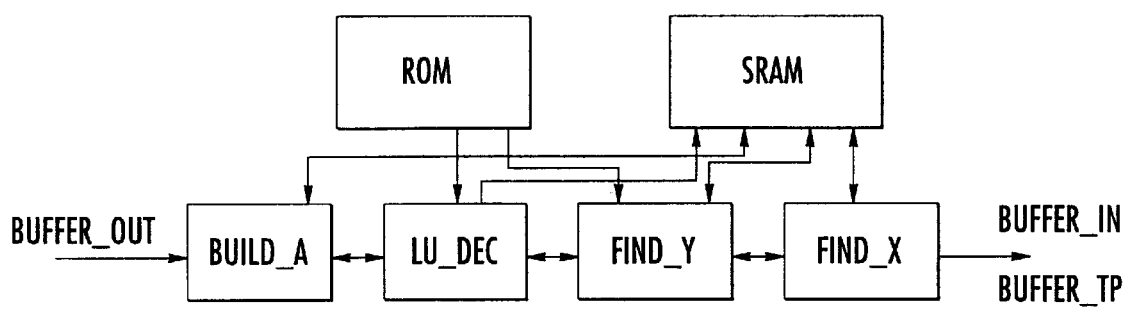
FIG. 14 highlights the functioning scheme of the processing module PU of the invention.

FIG. 14 shows a block diagram of the Processing Unit (PU), which carries out the actual decoding operations, that is, reconstructs the original block of data from the coded one. This PU module must be necessarily implemented in a hardware form because the operations must be executed very quickly (it should be kept in mind that the PET technique was created to protect video/audio sequences which may require transmission in real time). The different blocks shown in the scheme act in a sequential manner, meaning that when one of them terminates its processing operations, it enables the following block, and so forth.

Fundamentally, the task of the Processing Unit PU is that of solving a system of linear equations:

$$AX=B$$

therefore, the PU functioning may be summarized in the following four steps:

Construction of the matrix A
Triangular factorization of the matrix A:

$$A=LU; \rightarrow UX=Y; LY=B;$$

Solution of the system LY=B;
Solution of the system UX=Y.

The figure depicts the whole diagram of the PET Processing Unit. In this scheme, besides the SRAM and ROM memories, are shown the blocks: build_A, Lu_dec, find_Y and find_X, which implement the above described functions of the four processing steps previously illustrated.

To accelerate the decoding operations of the various data segments, the four modules of the Processing Unit function in parallel (pipelining), to process data in the four blocks simultaneously. This is possible because the operations undertaken by the single modules are independent of each other. The only circuit complexity caused by the pipelining is the need for a circuit that implements an appropriate bus arbitration algorithm, to prevent bus contention situations.

The scheme also includes memory devices, necessary for the PU to execute the decoding operations. In particular the memory devices include a static RAM memory or a SRAM for storing the intermediate results of the processing operations, and a ROM, from which is extracted the necessary information to carry out some of the decoding operations, typically the divisions.

Once the CU has reconstructed the coded blocks, the CU itself places them in the Buffer_Out, from where the PU reads them and sends the decoded information to a second buffer Buffer_In, from where, in turn, they are sent to the Lo-Hi_Out block and therefrom retrieved for sending them to the end user. A further buffer, Buffer_TP, is required to store the priority table containing the necessary information for decoding, which is itself decoded by the PU, and must be placed at the disposal of the CU to correctly reconstruct the distinct blocks.

The integration on a card as described in FIG. 3 of the various components: the PET decoder, the low consumption parallel programmable processor, and an MPEG decoder, realizes a module that is capable of satisfying numerous requirements of multimedia systems. The high processing capacity and the possibility of handling physical signals, permits the implementation of many applications in the communications realm. We may cite as examples of possible areas of application of such a module:

digital network nodes for an integrated management of data and voice (in particular for networks with voice compression);

interface systems of ATM, WAN and LAN channels;

management of broad band channels wherein the requirement of a high processing speed often comes with the requirements of performing parallel operations on more channels;

compression systems for data, voice and images;

multimedia systems;

Video On Demand;

Pay Per View; and teleconference.

In the field of the management of communication within industrial processes, either continuous or batch, the decoder of the invention is useful for:

managing systems of numerical control units and of cells (control of more devices);

telecontrol and monitoring systems; and data acquisition systems.

Moreover, in case of specific applications, an autonomous control and regulation system capable of handling physical systems requiring rapid responses and complex processing, may be required, as for example transport systems, building control systems, medical control and diagnostic systems, etc.

Cards incorporating the PET decoder of the invention may be used also as special units for accelerating data processing at work stations and PC's, like, for example, the compression of voice and images, the management of large/size databases for multimedia applications (videoconference, Video on Demand, retrieval of information from CD-ROMs, . . . ), scientific calculations in the chemistry and biology field, and simulation of physical phenomena, etc. In all these cases it will be important to ensure bus compatibility and, in some cases, also the ability to manage external signals.

That which is claimed is:

1. A modular PET decoder for an ATM network comprising:

a processing unit comprising a first memory for storing data for decoding processing, a second memory for storing intermediate results of decoding processing, and a processing pipeline, the processing pipeline for:

constructing, starting from a block of m digital data of a predefined number of bits, an m×m square matrix A based on a vector of relative points over a Galois field to which an m number of packets of coded information received at a decoder input refer to based upon header bits of the m packets, decomposing by a triangular factorization of the square m×m matrix A according to a scheme A=LU, where L is a resulting lower triangular matrix and U is a resulting upper triangular matrix into which the square matrix A is decomposed and from which UX=Y and LY=B, where B is a vector of polynomial values decoded as a function of a certain offset stored in header bits of the input packets, solving the systems LY=B and UX=Y by substitution; and a control unit connected to said processing unit for interfacing to the ATM network.

2. A modular PET decoder according to claim 1, further comprising a programmable parallel processor connected to said control unit.

3. A modular PET decoder according to claim 2, further comprising a random access memory connected to said control unit.

4. A modular PET decoder according to claim 3, wherein said control unit comprises:

a first block for interfacing with the ATM network; and a second block interfacing with said programmable parallel processor and transferring a predefined number of bits at each clock pulse.

5. A modular PET decoder according to claim 4, wherein said control unit further comprises:

a central unit; and a header reader controlled by said central unit sorting each of the m digital data in the related block depending on an address value provided by said central unit.

6. A modular PET decoder according to claim 5, wherein said control unit further comprises:

a memory interface preventively arbitrating possible conflicts among write cycles every time certain data is output by the first interface block with the ATM network, and read cycles of said random access memory by said central unit.

7. A modular PET decoder according to claim 6, wherein said control unit further comprises:

an offset removing block eliminating an effect introduced in the data during a coding phase, and outputting data of n+1 bits from two input data of n bits each.

8. A modular PET decoder according to claim 6, wherein said control unit further comprises:

an output buffer transferring data toward said processing unit;

an input buffer for decoded data received from said processing unit; and a third buffer containing data relative to a priority table decoded by said processing unit and made readable by said central unit.

9. A modular PET decoder according to claim 8, wherein said control unit further comprises:

a common bus operatively connected to be shared by said central unit, said memory interface modules, said interface blocks, and said header reader block for allowing a simultaneous acquisition of data thereby.

10. A modular PET decoder according to claim 1, wherein said control unit is monolithically integrated with said processing unit.

11. A modular PET decoder according to claim 1, wherein said first memory comprises a read only memory.

12. A modular PET decoder according to claim 1, wherein said second memory comprises a static memory.

13. A modular PET decoder for an ATM network comprising:

a processing unit comprising a first memory for storing data for decoding processing, a second memory for storing intermediate results of decoding processing, and a processing pipeline, the processing pipeline for:

constructing, starting from a block of m digital data of a predefined number of bits, an m×m square matrix A based on a vector of relative points over a Galois field to which an m number of packets of coded information received at a decoder input refer to based upon header bits of the m packets, decomposing by a triangular factorization of the square m×m matrix A according to a scheme A=LU, where L is a resulting lower triangular matrix and U is a resulting upper triangular matrix into which the square matrix A is decomposed and from which UX=Y and LY=B, where B is a vector of polynomial values decoded as a function of a certain offset stored in header bits of the input packets, and solving the systems LY=B and UX=Y by substitution;

a programmable parallel processor; and a control unit connected to said processing unit and monolithically integrated therewith for interfacing to the ATM network, said control unit comprising a first block for interfacing with the ATM network, and a second block interfacing with said programmable parallel processor and transferring a predefined number of bits at each clock pulse.

14. A modular PET decoder according to claim 13, further comprising a random access memory connected to said control unit.

15. A modular PET decoder according to claim 14, wherein said control unit further comprises:

a central unit; and a header reader controlled by said central unit sorting each of the m digital data in the related block depending on an address value provided by said central unit.

16. A modular PET decoder according to claim 15, wherein said control unit further comprises:

a memory interface preventively arbitrating possible conflicts among write cycles every time certain data is output by the first interface block with the ATM network, and read cycles of said random access memory by said central unit.

17. A modular PET decoder according to claim 16, wherein said control unit further comprises:

an offset removing block eliminating an effect introduced in the data during a coding phase, and outputting data of n+1 bits from two input data of n bits each.

18. A modular PET decoder according to claim 16, wherein said control unit further comprises:

an output buffer transferring data toward said processing unit;

an input buffer for decoded data received from said processing unit; and a third buffer containing data relative to a priority table decoded by said processing unit and made readable by said central unit.

19. A modular PET decoder according to claim 18, wherein said control unit further comprises:

a common bus operatively connected to be shared by said central unit, said memory interface modules said interface blocks, and said header reader block for allowing a simultaneous acquisition of data thereby.

20. A modular PET decoder according to claim 13, wherein said first memory comprises a read only memory.

21. A modular PET decoder according to claim 13, wherein said second memory comprises a static memory.

22. A method for PET decoding in an ATM network comprising the steps of:

providing a processing unit comprising a first memory for storing data for decoding processing, a second memory for storing intermediate results of decoding processing, and a processing pipeline; and operating the processing pipeline for:
constructing, starting from a block of m digital data of a predefined number of bits, an m×m square matrix A based on a vector D of relative points over a Galois field to which an m number of packets of coded information received at a decoder input refer to based upon header bits of the m packets,
decomposing by a triangular factorization of the square m x m matrix A according to a scheme A=LU, where L is a resulting lower triangular matrix and U is a resulting upper triangular matrix into which the square matrix A is decomposed and from which UX=Y and LY=B, where B is a vector of polynomial values decoded as a function of a certain offset stored in header bits of the input packets, and
solving the systems LY=B and UX=Y by substitution.

* * * * *

UNITED STATES PATENT AND TRADEMARK OFFICE
CERTIFICATE OF CORRECTION

PATENT NO. : 6,275,495 B1
DATED : August 14, 2001
INVENTOR(S) : Sergio Mazzaglia, Francesco Italia and Mario Lavorgna Page 1 of 1

It is certified that error appears in the above-identified patent and that said Letters Patent is hereby corrected as shown below:

<u>Column 4,</u>
Line 1, delete "offset (d)," insert -- offset (ε), --
Line 30 delete "rather that once" insert -- rather than once --

Signed and Sealed this

Sixteenth Day of April, 2002

Attest:

JAMES E. ROGAN
*Attesting Officer*         *Director of the United States Patent and Trademark Office*